United States Patent
Baranyai

(10) Patent No.: US 8,860,349 B2
(45) Date of Patent: Oct. 14, 2014

(54) METHOD AND DEVICE FOR SAFETY CUTOFF OF AN ELECTROMECHANICAL STEERING SYSTEM

(75) Inventor: Zoltan Baranyai, Herceghalom (HU)

(73) Assignee: ThyssenKrupp Presta AG, Eschen (LI)

( * ) Notice: Subject to any disclaimer, the term of this patent is extended or adjusted under 35 U.S.C. 154(b) by 129 days.

(21) Appl. No.: 13/810,029

(22) PCT Filed: Jul. 29, 2011

(86) PCT No.: PCT/EP2011/003824
§ 371 (c)(1),
(2), (4) Date: Jan. 14, 2013

(87) PCT Pub. No.: WO2012/016669
PCT Pub. Date: Feb. 9, 2012

(65) Prior Publication Data
US 2013/0113405 A1    May 9, 2013

(30) Foreign Application Priority Data

Aug. 4, 2010  (DE) .......................... 10 2010 033 440

(51) Int. Cl.
*B62D 5/04*    (2006.01)
(52) U.S. Cl.
USPC ........... 318/445; 318/432; 318/489; 318/490; 318/400.21
(58) Field of Classification Search
USPC ................ 318/445, 432, 489, 490, 400.21
See application file for complete search history.

(56) References Cited

U.S. PATENT DOCUMENTS 6,617,811 B2 *  9/2003  Schafert ......................... 318/139
7,474,071 B2 *  1/2009  Koeppl et al. ................. 318/489
(Continued)

FOREIGN PATENT DOCUMENTS

DE    102004030459 B3    7/2005

OTHER PUBLICATIONS

International Preliminary Report on Patentability issued in International Application PCT/EP2011/003824 issued Feb. 5, 2013.

(Continued)

*Primary Examiner* — Paul Ip
(74) *Attorney, Agent, or Firm* — Panitch Schwarze Belisario & Nadel LLP

(57) ABSTRACT

The invention relates to a method of safety cutoff of an electromechanical motor vehicle power steering, in which safety switches (26, 27, 28) are provided for electrical separation of a servomotor from a control system or a vehicle electrical system, wherein the following steps are provided:
a) receiving a fault signal in a control system (30);
b) sending a switch-off signal via control lines (31, 32, 33) to the safety switches (26, 27, 28);
c) checking the electrical voltages present on the safety switches (26, 27, 28);
d) deciding whether the switch-off signal on each safety switch (26, 27, 28) has led to switch-off;
e) if the switch-off signal on one or more safety switches (26, 27, 28) has not led to switch-off, switching those safety switches (26, 27, 28) back on, which could not be switched off;
f) repeating steps b) to e) until all safety switches have been switched off successfully (26, 27, 28).

9 Claims, 2 Drawing Sheets

(56) References Cited

U.S. PATENT DOCUMENTS

Figure 1:
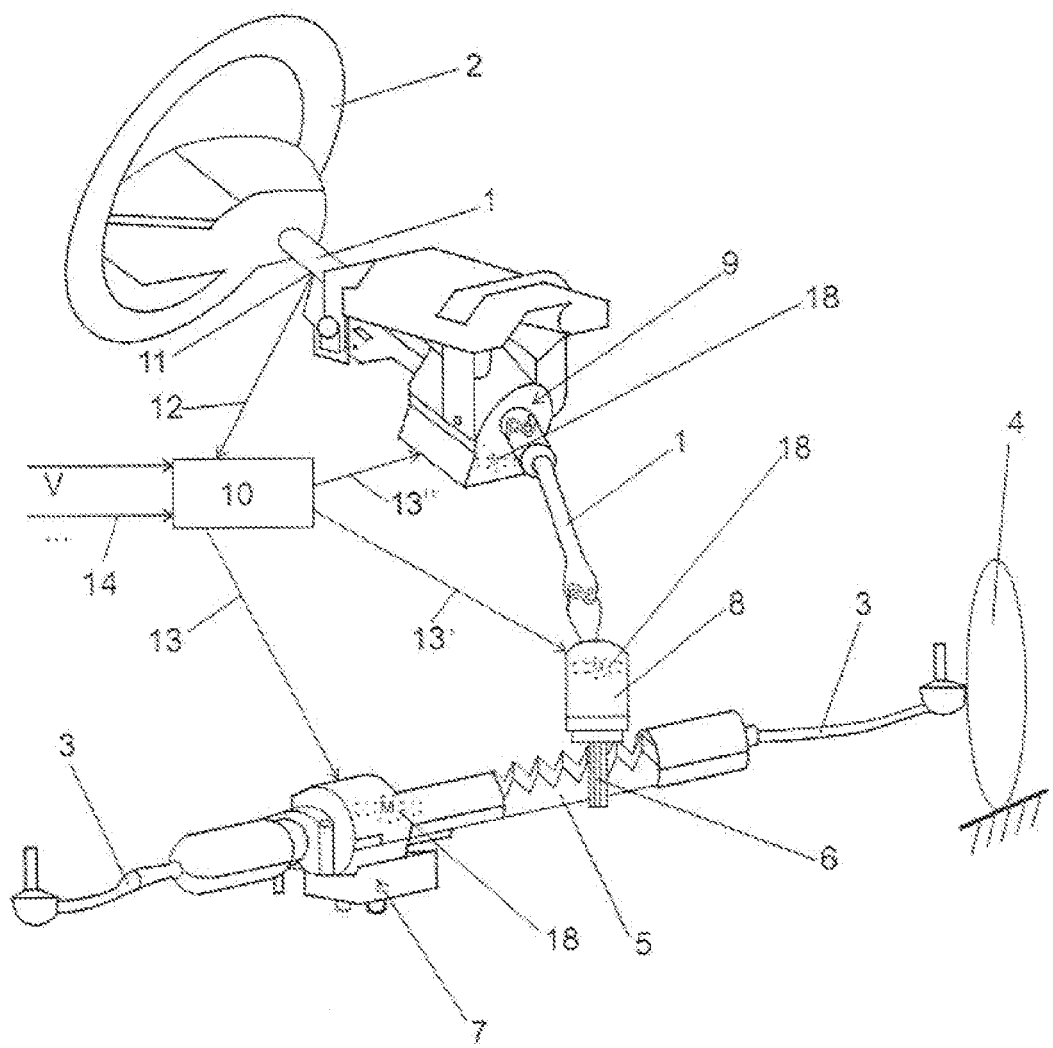

| | | | |
|---|---|---|---|
| 7,548,805 B2* | 6/2009 | Yamaguchi et al. | 701/36 |
| 7,772,725 B2* | 8/2010 | Siman-Tov | 307/140 |
| 2001/0037909 A1* | 11/2001 | Schafert | 180/443 |
| 2005/0162795 A1* | 7/2005 | Leiber | 361/93.1 |
| 2007/0064460 A1* | 3/2007 | Siman-Tov | 363/132 |
| 2007/0069674 A1* | 3/2007 | Koeppl et al. | 318/432 |
| 2008/0004773 A1* | 1/2008 | Maeda | 701/41 |
| 2013/0140104 A1* | 6/2013 | Dzsudzsak | 180/404 |
| 2013/0193885 A1* | 8/2013 | Gunselmann et al. | 318/400.21 |
| 2013/0320906 A1* | 12/2013 | Byun | 318/490 |

OTHER PUBLICATIONS

International Search Report and Written Opinion issued in International Application PCT/EP2011/003824 mailed Oct. 27, 2011 with English translation of International Search Report.

* cited by examiner

METHOD AND DEVICE FOR SAFETY CUTOFF OF AN ELECTROMECHANICAL STEERING SYSTEM

CROSS-REFERENCE TO RELATED APPLICATIONS

This Application is a National Stage of PCT International Application No. PCT/EP2011/003824, filed on Jul. 29, 2011, and claims priority of German Patent Application No. 10 2010 033 440.5, filed on Aug. 4, 2010. The disclosures of the aforementioned applications are incorporated herein in their entirety by reference.

The present invention relates to a method of operating an electromechanical steering system for motor vehicles with the features of the characterizing clause of claim 1 and a device with the features of the characterizing clause of claim 7.

A method of this kind for safety cutoff of electromechanical motor vehicle power steering is known from document DE 10 2004 030 459 B3. In this method, is if there is a fault, a reluctance or series-wound motor is cut off by means of a switch or by short-circuiting the power source. Further process steps are not necessary in this case, as a motor of this kind does not have any permanent magnets and therefore cannot produce any braking torque. This method is not directly suitable for a permanently excited motor.

Electromechanical steering systems usually have a permanently excited synchronous motor as servomotor. Servomotors of this type are controlled by a control system via a set of MOSFETs, and if there are three phase windings a total of six MOSFETs is provided. In each case one MOSFET switches the assigned phase winding to the on-board voltage or the frame potential. This takes place at high frequency, so that in the phase winding the temporal mean value acts as the effective voltage.

Permanently excited synchronous motors have the property that if there are electrical faults, for example in the case of short-circuits in the motor or in the control system, they produce a braking torque, so that such a fault can lead not only to a failure of the steering power-assistance system, but an additional resistance opposes the driver's steering movement. This cannot be tolerated in the case of steering systems for motor vehicles on safety grounds.

For avoiding this state, it is known to provide separation of the phase supply leads to the motor or at the star point of the motor. Sometimes electromechanical relays are proposed for this in the state of the art, but they are not sufficiently mechanically robust for applications in motor vehicles and they are relatively expensive.

From document EP 0 857 135 B1, electrical power steering for a vehicle is known, which has an electric motor that is connected via gears to a steering system of the vehicle, wherein the electric motor is a brushless motor with several phase windings connected at one star point. It is envisaged that in at least two phases of the motor, a switching means is provided, which is movable between a closed position, at which current can flow in the phase winding, and an open position, which prevents current flowing in the respective phase winding of the motor. The switching means is arranged at the star point of the motor, so that on opening the switching means, the phase winding is separated from the star point. The switching means comprises a switch or a relay, which is connected in series between one end of the phase winding and the drive circuit of the motor.

Technical solutions that comprise semiconductors as switching means are known for example from documents DE 10 2004 023 713 A1, DE 10 2007 024 659 A1 and EP 2 112 051 A1. This last-mentioned document shows several embodiments with in each case six MOSFETs for controlling the windings and with further MOSFETs, which are provided as safety switches between the drive circuit and the motor windings. In the case of an electrical fault, these safety switches should cut the electrical connection between the drive circuit and the windings. The windings are not then short-circuited and cannot produce any braking torque.

For controlling these safety switches, it is envisaged in EP 2 112 051 A1 to measure and monitor the current through the windings. Depending on the current that flows through the MOSFETs provided as safety switches, in an accident the MOSFETs are switched off, and indeed only when there is no current flowing through the respective MOSFET or when the current flows in one direction and switches on a parasitic diode. The MOSFET is not switched off if neither of the two conditions is fulfilled. This should prevent the MOSFET being switched off in a state that could lead to an avalanche breakdown.

For use in motor vehicles, it is a disadvantage that the separate measurement of the currents flowing through the safety switches is complicated and correspondingly expensive and that the time required for the checking described, before switching off, slows down the process.

Therefore the problem to be solved by the present invention is to provide, for an electrically assisted motor vehicle steering system provided with MOSFETs as safety switches, a method that is simpler to implement and, in operation, can be carried out more quickly.

This problem is solved by a method with the features of claim 1.

Because, if required, the control system first switches off each individual MOSFET safety switch and then verifies the voltages present on the connections of the MOSFETs, the development of an avalanche breakdown, or a corresponding state in which a voltage between drain and source is greater than the maximum battery voltage, at which the electromechanical steering system must still provide power, can be determined on the basis of these voltages. This process can take place so rapidly that if an avalanche breakdown or a corresponding state is measured, the MOSFET affected can be switched on again, before thermal damage can occur. If no avalanche breakdown occurs, the MOSFET remains switched off. The reaction time of this approach can lead much more quickly to the desired switching off, because it is switched off first and is then checked for the presence of disturbing conditions, whereas in the state of the art, checking is carried out first, and then it is switched off, if no disturbing conditions are present.

In particular, in a method for safety cutoff of an electromechanical motor vehicle power steering, in which safety switches are provided for electrical separation of a servomotor from a control system or a vehicle electrical system, the following steps are provided:
a) receiving a fault signal in a control system;
b) sending a switch-off signal via control lines to the safety switches;
c) checking the electrical voltages present on the safety switches;
d) deciding whether the switch-off signal on each safety switch has led to switch-off without avalanche breakdown or a corresponding state;
e) if the switch-off signal on one or more safety switches has not led to switch-off without avalanche breakdown, switching back on those safety switches that could not be switched off without avalanche breakdown;

f) repeating steps b) to e) until all safety switches have been switched off successfully.

The method protects the individual safety switches against overload, when steps b) to e) are carried out in a time period of less than 50 μs, especially in a period from 1 μs to 20 μs and especially preferably within 2 μs.

Almost simultaneous switching off with nevertheless effective protection of the safety switches is achieved when there is a delay time of 500 μs to 5 ms, especially a delay time of 1 ms to 2 ms between step e) and step f).

The problem is also solved by a device for carrying out the method, in which the control system is set up for evaluating the voltages present on the safety switches and is connected to the safety switches.

In particular, the safety switches can be MOSFETs and the control system can evaluate the voltages present on the source or drain terminals, in order to detect an undesirable avalanche breakdown.

A particularly simple construction is obtained if, on the electrical line between the safety switches and the phase windings of the servomotor, sensor lines are provided for sensing the electrical voltage present there.

Moreover, the circuit with which the method according to the invention can be carried out is simpler and less expensive than in the prior art.

Figure 2:
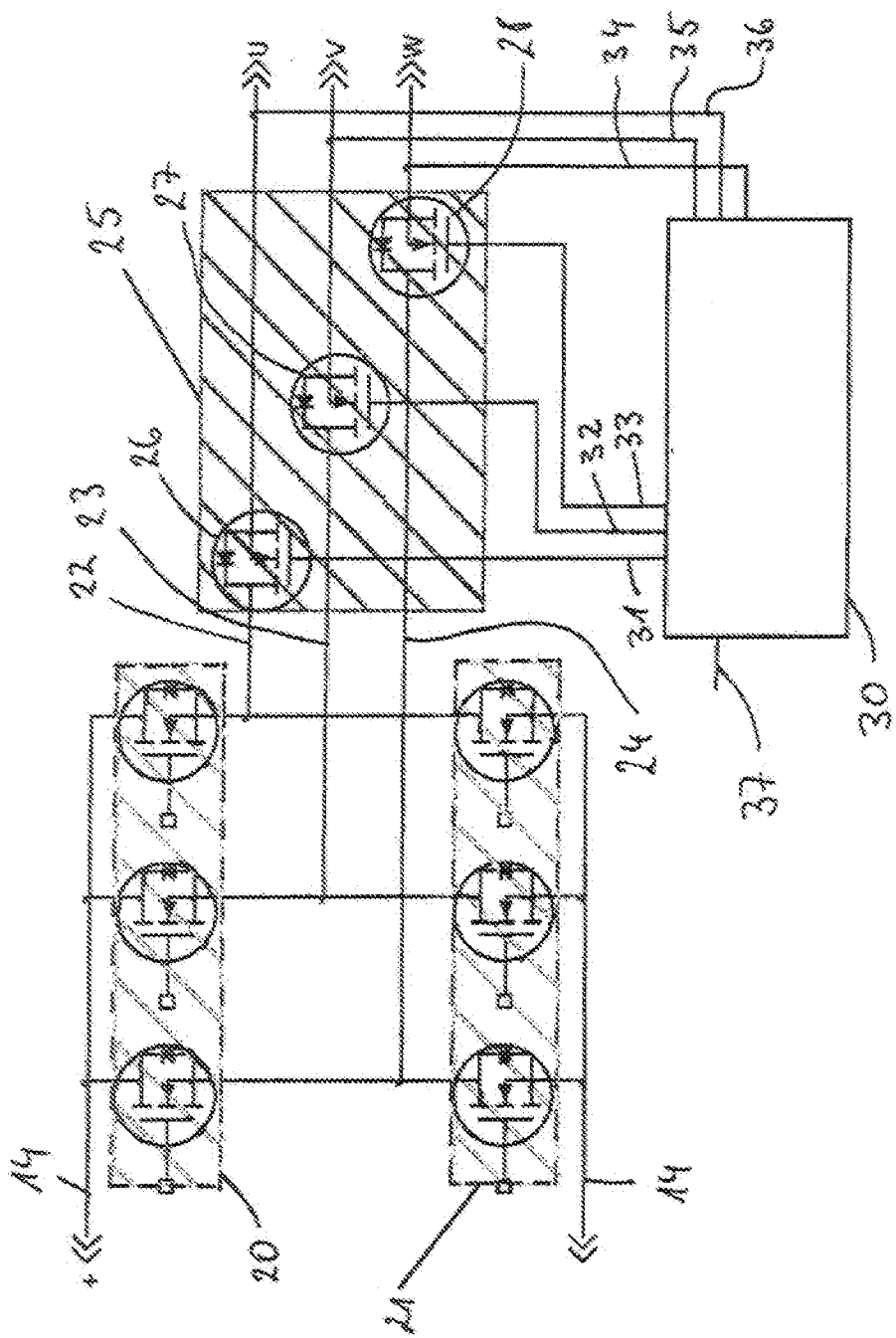

Practical examples of the present invention are described below on the basis of the drawing, showing:

FIG. 1: a schematic representation of an electromechanical power steering with several possibilities for arrangement of the servomotor;

FIG. 2: a circuit for controlling a permanently excited synchronous motor with six MOSFETs for controlling the motor current and three safety switches constructed as MOSFETs as an example of implementation.

The term "avalanche breakdown", in the context of the description and of the patent claims, should not be understood in the strict sense, but also stands for a corresponding state, in which a voltage between drain and source is greater than the maximum battery voltage, at which the electromechanical steering system must still provide power, but which, as a result of voltage-limiting measures, does not lead to the development of avalanche breakdown in the true sense. Nevertheless, such a state also leads to destruction of the affected MOSFET after a short time.

FIG. 1 shows an electromechanical power steering schematically, and aims to illustrate various embodiments.

A steering-column spindle 1 is connected to a steering wheel 2, for operation by the driver. Track rods 3 are connected in a known way to steered wheels 4 of the motor vehicle. A rotation of the steering-column spindle 1 brings about an axial displacement of a rack 5 by means of a pinion 6 connected non-rotating to the steering-column spindle 1.

The electromechanical power steering can have a motor housing 7 on the steering-gear side, a motor housing 8 on the steering pinion side or a motor housing 9 on the steering-column side. The present invention is independent of the concrete design of the steering system. The motor housings 7, 8 or 9 are connected to a control system 10, which among other things receives torque signals from a torque sensor 11 via a signal line 12 and sends the corresponding control signals via signal lines 13, 13' or 13" to the servo drive arranged in one of the housings 7, 8 or 9. The control system 10 itself receives input signals, for example the vehicle speed, and via a supply line 14, the on-board voltage of the motor vehicle necessary for operation.

In housings 7, 8 or 9, a servomotor 18 is provided, which finally is controlled depending on the input signals of the sensor 11 or the other input signals supplied from the vehicle. This design is known from the prior art.

The servomotors 18 are, in the present invention, permanently excited synchronous motors. With respect to control of the phase windings of the servomotor 18, the control system 10 is constructed as an inverter. This circuit is shown in more detail in FIG. 2.

FIG. 2 shows the basic circuit of the power part of the control system 10. The supply lines 14 are connected to the positive and the negative pole of the on-board electrical system of the motor vehicle, which operates in the usual way with direct current. A first group 20 comprises three MOSFETs for supplying the three phase windings u, v and w with the on-board voltage. A second group 21 of a total of three further MOSFETs is provided for supplying the phase windings u, v and w with the frame potential. For this purpose, the two groups 20 and 21 supply the three lines 22, 23 and 24.

Between the inverter circuit, which comprises the two groups 20 and 21, another group 25 is included, which also comprises three MOSFETs 26, 27 and 28. These three MOSFETs are in each case connected in series between the output of groups 20 and 21 and the input of the phase windings u, v and w, so that a current can only flow through the phase windings when the particular MOSFET assigned is connected as conducting. More precisely, the three MOSFETs 26, 27 and 28 of this group 25 are connected so that intrinsic diodes point in the same direction relative to the phase windings u, v and w. With this form of connection, the induction voltage of the motor 18 cannot drive any current through the MOSFETs 26, 27 and 28.

A control system 30 is connected to the MOSFETs 26, 27 and 28 of the third group 25. For this purpose, the control system 30 has control lines 31, 32 and 33. These control lines are in each case connected to the control electrodes (gate) of the MOSFETs 26, 27 and 28.

On the output side of the third group 25, between the MOSFETs and the phase windings u, v and w, in each case a sensor line 34, 35 or 36 is connected on the current-carrying line. The sensor lines 34, 35 and 36 supply, to the control system 30, the voltages that are on the source terminals of MOSFETs 26, 27 and 28, which are also present on the phase windings u, v and w.

The control system 30 receives, via an input line 37, a signal for switching on or switching off the third group 25, so that the servomotor is connected to or separated from the inverter circuit, i.e. in the two groups 20 and 21.

In operation, the MOSFETs of the third group 25 represent safety switches for switching off the servomotor in the case of an electrical malfunction. For this purpose, the control system 30 operates so that first, the third group 25 is switched on via the control lines 31, 32 and 33 at a switch-on signal, which is present on line 37. The phase windings u, v and w can now be controlled via the first and second group 20 and 21, so that depending on the control system 10, the servomotor produces a corresponding supporting torque that acts upon the steering gear. Only when the control system 10 or another monitoring circuit detects an electrical fault, which detects an excessive servo assistance or also an undesirable braking torque of the electric motor through absence of servo assistance, a switch-off command is sent via line 37 to the control system 30. In this case the MOSFETs of the third group are switched off practically immediately via the control lines 31, 32 and 33. The sensor lines 34, 35 and 36 transmit the voltages at the output of MOSFETs 26, 27 and 28 to the control system 30. If switch-off was successful, this voltage it is at zero or it is positive. If switch-off was not successful, and thus an avalanche breakdown has developed, there is a high negative voltage on the affected line. This is detected by the control system 30 and the affected MOSFET is switched on again immediately. The preferred time between the switch-off command, detection of avalanche breakdown and switching the affected MOSFET back on is about two microseconds (μs). Moreover, times of up to 10 or 20 μs are also still tolerable. These times are short enough to preclude damage to the MOSFETs of the third group 25.

After the affected MOSFET has been switched back on, this is again switched to be conducting, which had not led to the desired success (switching-off of all three phase windings). Therefore the attempt to switch off this MOSFET is repeated regularly. Preferably the renewed switching-off of this affected MOSFET takes place after a delay of about 1-2 ms. If the current flowing through the inductances of the motor has dropped so far that avalanche breakdown no longer develops, the MOSFET is finally switched off. For as long as these currents are still too high, an avalanche breakdown will be detected again via the respective sensor line and the MOSFET will be switched on again after a very short time, to prevent damage through overload.

The circuit shown in FIG. 2 is known from the prior art with respect to the arrangement of the MOSFETs between the on-board voltage of the motor vehicle and the phase windings u, v and w of the servomotor. The control system 30, which receives its information about the switching state of the MOSFETs of the third group 25 via the sensor lines 34, 35 and 36, has the advantages described at the beginning. The switching off of the supply voltage of the phase windings takes place extremely rapidly. Unsuccessful switch-off does not lead to destruction of the affected MOSFET. The switch-off attempts repeated with high frequency nevertheless lead to an almost simultaneous switch-off of all three MOSFETs of the third group 25. The protection against overload that has been described makes it possible to use identical or similar MOSFETs in the first group 20, the second group 21 and the third group 25, without the need for special high-performance components in group 25.

The present invention, in particular the method of switching off with verification for possible unsuccessful switch-off and optionally switching the affected MOSFET back on can also be used in other configurations. For example, in the two supply leads 14 before the first group 20 and the second group 21, in each case a MOSFET can be provided, which is operated by a correspondingly adapted circuit 30 and is switched off if there is a fault.

What is claimed is:

1. A method for safety cutoff of an electromechanical motor vehicle power steering system, in which safety switches are provided for electrical separation of a servomotor from a control system or a vehicle electrical system, the method including:
   a) receiving a fault signal in a control system;
   b) sending a switch-off signal via control lines to the safety switches;
   c) checking electrical voltages present on the safety switches;
   d) deciding whether the switch-off signal on each safety switch has led to switch-off without avalanche breakdown;
   e) if the switch-off signal on one or more safety switches has not led to switch-off without avalanche breakdown, switching back on those safety switches that could not be switched off without avalanche breakdown;
   f) repeating b) to e) until all safety switches have been switched off successfully without avalanche breakdown.

2. The method according to claim 1, wherein b) to e) are carried out in a period of less than 50 μs.

3. The method according to claim 1, wherein b) to e) are carried out in a period of 1 μs to 20 μs.

4. The method according to claim 1, wherein b) to e) are carried out in a period of 2 μs.

5. The method according to claim 1, wherein there is a delay time of 500 μs to 5 ms between e) and f).

6. The method according to claim 1, wherein there is a delay time of 1 ms to 2 ms between e) and f).

7. An apparatus for carrying out the method according to claim 1, the apparatus including the control system and the safety switches, wherein the control system is configured to evaluate the voltages present on the safety switches and is connected to the safety switches.

8. The apparatus according to claim 7, wherein the safety switches include MOSFETs, and wherein the control system is configured to evaluate voltages present on the source and/or drain terminals of the MOSFETs.

9. The apparatus according to claim 7, further comprising sensor lines disposed on one or more electrical lines coupling the safety switches to phase windings of the servomotor and configured to sense one or more voltages present on the respective one or more electrical lines.

\* \* \* \* \*